US010662586B2

United States Patent
Kokko et al.

(10) Patent No.: US 10,662,586 B2
(45) Date of Patent: May 26, 2020

(54) CATIONIC POLYETHERAMINE DISPERSANTS FOR PREPARING PAPERMAKING STOCK

(71) Applicant: GPCP IP Holdings LLC, Atlanta, GA (US)

(72) Inventors: Bruce J. Kokko, Neenah, WI (US); Daniel W. Sumnicht, Hobart, WI (US); Wayne F. Winkler, DePere, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 129 days.

(21) Appl. No.: 15/984,582

(22) Filed: May 21, 2018

(65) Prior Publication Data

US 2019/0003123 A1    Jan. 3, 2019

Related U.S. Application Data

(60) Provisional application No. 62/525,849, filed on Jun. 28, 2017.

(51) Int. Cl.

| | |
|---|---|
| *D21H 21/08* | (2006.01) |
| *C08G 73/02* | (2006.01) |
| *D21H 23/04* | (2006.01) |
| *D21H 11/12* | (2006.01) |
| *D21H 17/56* | (2006.01) |
| *D21H 17/52* | (2006.01) |

(Continued)

(52) U.S. Cl.
CPC ........... *D21H 21/08* (2013.01); *C08G 73/024* (2013.01); *D21H 11/12* (2013.01); *D21H 17/455* (2013.01); *D21H 17/52* (2013.01); *D21H 17/56* (2013.01); *D21H 17/72* (2013.01); *D21H 23/04* (2013.01)

(58) Field of Classification Search
CPC ...... D21H 21/08; D21H 17/455; D21H 17/52; D21H 17/56; D21H 17/72; D21H 23/04; C08G 73/024
See application file for complete search history.

(56) References Cited

U.S. PATENT DOCUMENTS

| | | |
|---|---|---|
| 4,156,775 A | 5/1979 | Evani et al. |
| 4,198,269 A | 4/1980 | Evani et al. |
| 4,267,059 A | 5/1981 | Behn et al. |

(Continued)

OTHER PUBLICATIONS

Matsumoto et al. (Macromolecules, vol. 42, No. 13, 2009, 4580-4584).*

(Continued)

*Primary Examiner* — Shane Fang
(74) *Attorney, Agent, or Firm* — Laura L. Bozek

(57) ABSTRACT

A cationic polyether amine dispersant for papermaking fibers comprises the polymeric reaction product of a polyether diamine, a polyether bisepoxide and a quaternary ammonium salt. The polyether diamine, the polyether bisepoxide and the quaternary ammonium salt reactants are reacted in the following molar ratios: the molar ratio of amine functionality of the polyether diamine to epoxide functionality of the polyether bisepoxide is from 0.5:1 to 2:1 and the molar ratio of the amine functionality of the polyether diamine to the epoxide functionality of the quaternary ammonium salt is from 10:1 to 40:1. The dispersant is used in stock preparation used in paper products including absorbent products as well as paperboard.

20 Claims, 2 Drawing Sheets

(51) Int. Cl.
    *D21H 17/00*     (2006.01)
    *D21H 17/45*     (2006.01)

(56) References Cited

U.S. PATENT DOCUMENTS

| | | |
|---|---|---|
| 4,281,199 A | 7/1981 | Langdon |
| 4,567,302 A | 1/1986 | Sivaramakrishnan |
| 5,039,787 A | 8/1991 | Tanaka et al. |
| 5,091,574 A | 2/1992 | Lin et al. |
| 7,303,992 B2 | 12/2007 | Paneccasio et al. |
| 7,423,112 B2 | 9/2008 | Adkins |
| 8,778,138 B2 | 7/2014 | Super et al. |

OTHER PUBLICATIONS

Rojas et al., The Dispersion Science of Papermaking, Journal of Dispersion Science and Technology, 2004, pp. 713-732, vol. 25, No. 6, Marcel Dekker, Inc.

Gel Permeation Chromatography (GPC), [GPC Capabilities], Aug. 2014, pp. 1-28, Waters Corporation.

\* cited by examiner

CATIONIC POLYETHERAMINE DISPERSANTS FOR PREPARING PAPERMAKING STOCK

CLAIM FOR PRIORITY

This application is based on U.S. Provisional Application No. 62/525,849, filed Jun. 28, 2017 of the same title, the priority of which is hereby claimed and the disclosure of which is incorporated herein by reference.

TECHNICAL FIELD

This invention relates to cationic polyetheramine dispersants for preparing papermaking fiber slurries, sometimes referred to as papermaking stock or furnishes. The cationic polyetheramines of the invention are especially useful to disperse relatively long cellulosic papermaking fibers having a length of about 5 mm or more.

BACKGROUND

Before pulp can be made into paper, it must undergo several steps referred to as stock preparation, sometimes including slurrying of dried pulp or wastepaper, the blending of different pulps, dilution, refining, beating and the addition of chemicals. The raw stocks used are the various types of chemical pulp, mechanical pulp, and recovered paper and their mixtures. Raw stock is available in the form of bales, loose material or broke, or, in the case of integrated mills, as suspensions. Among virgin pulps, unbleached kraft and hydrophilic fibers such as naturally occurring hemp and solvent regenerated fibers are notably difficult to defiber and disperse. An example of a solvent regenerated fiber is lyocell, in particular 8 mm lyocell fiber. Once dispersed, these hydrophilic fibers have a strong tendency to entangle and knit back together or otherwise form into fiber bundles, sometimes referred to as "nits".

Stock preparation systems differ considerably depending on the raw stock used and on the quality of the finished stock (furnish) required. For instance, in the case of pulp being pumped directly from a pulp mill, slushing and deflaking stages are omitted. When using dried pulp or wastepaper, on the other hand, pulpers are used to initially disperse the papermaking fibers into a slurry. Pulpers may be operated at low consistency (<5%), medium consistency (6%-8%) or high consistency (10%-30%). The quality of the furnish greatly influences the properties of the paper produced.

In order to produce high quality paper products, it is preferred to avoid papermaking fiber flocs and papermaking fiber nits in the papermaking stock. Flocculation and nit formation in the papermaking stock has been attributed to various factors including relatively long fibers, relatively low fiber coarseness, curled fibers, wide fiber length distribution, fibrillated fiber surfaces, stiff fibers, low viscosity, low shear and fiber charge close to zero. Ideally, it is preferred that individual fibers in the papermaking stock are well dispersed. Papermaking flocs or nits can form or persist during stock preparation or storage prior to being formed into a sheet, even though the fibers are subject to mechanical agitation.

Polyoxyethylene diamine derivatives of diglycidyl ethers are known to be useful in connection with epoxy resins. See U.S. Pat. No. 5,091,574 to Lin et al.; U.S. Pat. No. 7,423,112 to Adkins; U.S. Pat. No. 7,303,992 to Paneccasio et al.; U.S. Pat. No. 5,039,787 to Tanaka et al.; U.S. Pat. No. 4,567,302 to Sivaramakrishnan; and U.S. Pat. No. 4,281,199 to Langdon. Epoxy/polyethylene glycol ether amine resins are reported to be useful as retention aids in U.S. Pat. No. 4,267,059 to Behn et al. Quaternized polyether/oxirane materials have been reported useful as strength aids for paper manufacture. See U.S. Pat. No. 4,198,269 to Evani et al., as well as U.S. Pat. No. 4,156,775, also to Evani et al.

While polymeric additives are well-known in the papermaking art, they have been used only sparingly as aids for dispersing pulps. Achieving a sufficiently uniform sheet has always been a key challenge because cellulose fibers have a high length to thickness ratio and tend to become entangled, forming fiber flocs. See Rojas et al., the Dispersion Science of Papermaking, Journal of Dispersion Science and Technology, Vol. 25, No. 6, pp. 713-732 (2004). Gum-like polymers (i.e., carboxymethylcellulose) can improve dispersion by (presumably) reducing inter-fiber friction; however, such polymers can dramatically reduce drainage and are preferably avoided as a dispersing aid in papermaking operations. The conventional method of choice is thus to apply high hydrodynamic shear to the pulp which is sometimes ineffective, especially with hard to disperse papermaking fibers.

Given the difficulty in repulping recovered paper and dried hydrophilic pulps of fibers such as hemp, flax, cotton and solvent regenerated fibers and the like, there is a need in the art for improved chemical dispersants for dispersing the fibers in papermaking stock. Treating the fibers during stock preparation to avoid nits and flocs is a particular advantage of the present invention. It is also desirable to disperse fiber pulp without unduly increasing the viscosity of the resulting fiber slurry.

SUMMARY OF THE INVENTION

There is provided in accordance with the present invention a cationic polyether amine dispersant for papermaking fibers comprising the polymeric reaction product of a polyether diamine comprising the formula I:

$$NH_2\text{-}Q\text{-}P^1\text{-}Q\text{-}NH_2 \qquad\qquad I,$$

wherein,
$P^1$ is 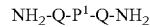, $-(EO)_x(AO)_y(EO)_z-$, or combinations thereof;
Q is a $C_1$-$C_8$ alkylene or a direct bond;
EO is oxyethylene ($-(OCH_2CH_2)-$);
AO is oxyalkylene comprising 3 to 6 carbon atoms; and
u+w or y is from 0 to 20, v or x+z is from 4 to 60;
a polyether bisepoxide comprising the formula II:

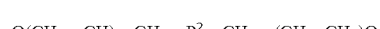

wherein,
$P^2$ is $-(AO)_o(EO)_p(AO)_q-$ or $-(EO)_r(AO)_s(EO)_t-$;
EO is oxyethylene ($-(OCH_2CH_2)-$);
AO is oxyalkylene comprising 3 to 6 carbon atoms; and
p or r+t is from 2 to 60, o+q or s is from 0 to 8;
and a quaternary ammonium salt comprising the formula III:

wherein,
$R^1$, $R^2$, and $R^3$ are each independently $C_1$-$C_8$ alkyl; and
X is a counteranion.

The polyether diamine, the polyether bisepoxide and the quaternary ammonium salt reactants are reacted in the following molar ratios: the molar ratio of amine functionality of the polyether diamine to epoxide functionality of the polyether bisepoxide is from 0.5:1 to 2:1 and the molar ratio of the amine functionality of the polyether diamine to the epoxide functionality of the quaternary ammonium salt is from 10:1 to 40:1.

Without intending to being bound by theory, it is believed that the cationic polyetheramine dispersants of the invention function by associating with the fiber surfaces thereby setting up steric repulsion between neighboring fibers during stock preparation.

BRIEF DESCRIPTION OF THE DRAWINGS

The invention is described in detail below with reference to the drawings wherein.

DETAILED DESCRIPTION

Figure 1:
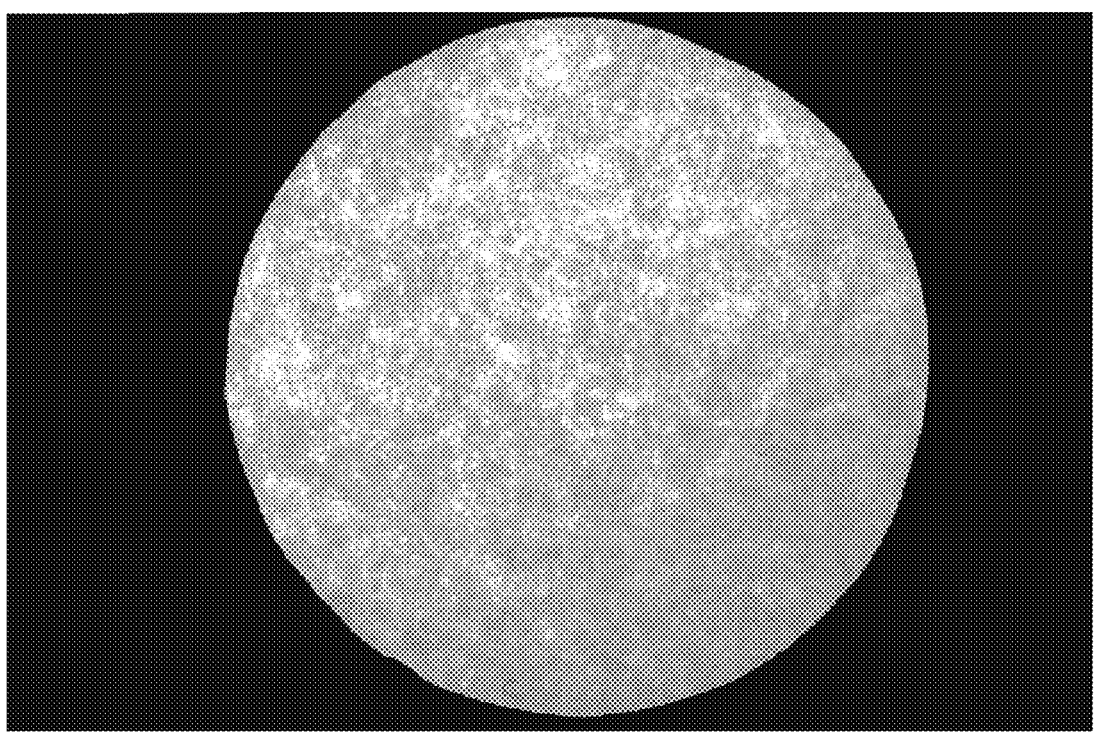
FIG. 1 depicts handsheets of hemp fibers—untreated (top) and treated with cationic polyetheramine dispersant (bottom)
Figure 1:
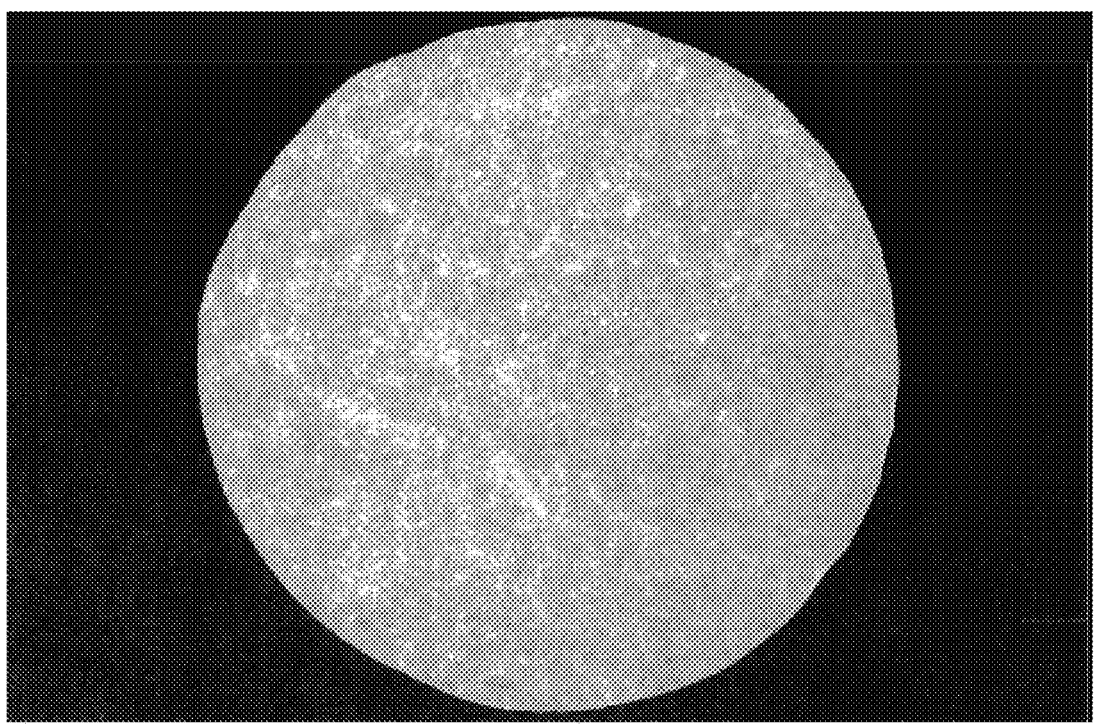

The invention is described in detail below in connection with the Figures for purposes of illustration only. The invention is defined in the appended claims. Terminology used herein is given its ordinary meaning consistent with the exemplary definitions set forth herein. The singular forms "a," "an," and "the" are intended to include the plural forms as well, unless the context clearly indicates otherwise. The endpoints of all ranges directed to the same component or property are inclusive of the endpoint and independently combinable, except when the modifier "between" is used. The modifier "about" used in connection with a quantity is inclusive of the stated value and has the meaning dictated by the context (e.g., includes the degree of error associated with measurement of the particular quantity). A "combination" is inclusive of blends, mixtures, alloys, reaction products, and the like. In general, the compositions or methods can alternatively comprise, consist of, or consist essentially of, any appropriate components or steps disclosed. The invention can additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

Unless otherwise defined, all terms (including technical and scientific terms) used have the same meaning as commonly understood by one of ordinary skill in the art to which this invention belongs. Compounds are described using standard nomenclature. Any position not substituted by any indicated group is understood to have its valency filled by a bond as indicated, or a hydrogen atom. A dash ("-") that is not between two letters or symbols is used to indicate a point of attachment of a substituent. For example, —CHO is attached through carbon of the carbonyl group.

Unless otherwise indicated, percent, % and the like refers to wt percent.

Absorbent products incorporating treated fibers of the invention include cellulosic fiber basesheet and have an absorbency or SAT value as well as tensiles and densities suitable for tissue and towel products. Typical SAT values are greater than about 3 g/g in most cases. See U.S. Pat. No. 8,778,138. Paperboard products may likewise be made with the fibers of the invention treated with the cationic polyetheramine dispersant.

Add-on of various components in lbs/ton is expressed in lbs additive per ton of air dry pulp or papermaking fibers.

"Air dry" or simply "dry" means including residual moisture, by convention up to about 10 percent moisture for pulp and up to about 6 percent for paper; while oven dry refers to pulp or paper which is dried in an oven for several hours and is significantly drier.

"Alkyl" means a straight or branched chain saturated aliphatic hydrocarbon having the specified number of carbon atoms and a valence of at least 1. "Alkylene" means a straight or branched divalent aliphatic hydrocarbon group having the specified number of carbon atoms and a valence of at least 2. "Aryl" means a cyclic moiety in which all ring members are carbon and a ring is aromatic, and having a valence of at least 1. More than one ring can be present, and any additional rings can be independently aromatic, saturated or partially unsaturated, and can be fused, pendant, spirocyclic or a combination thereof. While stereochemistry of the various compounds is not explicitly shown, it is to be understood that this disclosure encompasses all isomers.

"Consisting essentially of" and like terminology refers to the recited components and excludes other ingredients which would substantially change the basic and novel characteristics of the composition or article. Unless otherwise indicated or readily apparent, a composition or article consists essentially of the recited or listed components when the composition or article includes 90% or more by weight of the recited or listed components. That is, the terminology excludes more than 10% unrecited components.

Consistency refers to percent solids of a slurry or nascent web, calculated on a bone dry basis. For example, a nascent web having 50 wt percent water and 50 wt percent bone dry pulp has a consistency of 50 percent.

The term "cellulosic papermaking fiber" and like terminology is meant to include any papermaking fibers having cellulose as a major constituent. "Cellulosic papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute, hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as *eucalyptus*, maple, birch, aspen, or the like which are optionally prepared by way of the Kraft process. Papermaking fibers used in connection with the invention may be naturally occurring pulp-derived fibers which are liberated from their source material by any one of a number of pulping processes familiar to one experienced in the art including sulfate, sulfite, polysulfide, soda pulping, etc. or mechanical pulping. Reconstituted cellulose fibers such as lyocell or rayon are likewise suitable. Lyocell fibers are made by dissolving wood pulp in N-methylmorpholine and spun into fibers in a dry jet-wet spinning process. Rayon fibers may be made by the acetate process, viscose process or with other processes as are well known. "Furnishes" and like terminology refers to aqueous compositions including papermaking fibers, optionally wet strength resins, debonders, retention aids, charge control agents and the like for making paper products.

The invention is particularly useful in connection with relatively long fibers, having a length of 5 mm or more, such as at least 6 mm. Such fibers include hemp fibers, flax fibers, cotton fibers, rayon fibers or lyocell fibers. Lyocell fibers are sold under the mark Tencel®.

Canadian Standard Freeness or "CSF" is used to measure drainage. CSF is determined in accordance with TAPPI Standard T 227 OM-94 (Canadian Standard Method).

Fiber morphology is measured with an OpTest Fiber Quality Analyzer (FQA). Unless otherwise specified, the FQA is obtained from OpTest Equipment, Hawkesbury, Ontario, Canada, Model No. Code LDA 96 or equivalent. For purposes of measuring average fiber length, The FQA is operated at standard settings, that is, the settings are for fibers 0.5 mm and longer with curl indices from 0 to 5. The FQA measures individual fiber contour and projected lengths by optically imaging fibers with a CCD camera and polarized infrared light.

Average fiber length reported herein is the length-weighted average length calculated as follows:

$$L_w = \frac{\sum_{all\ fibers} n_i L_i^2}{\sum_{all\ fibers} n_i L_i}$$

Fines are all particles less than 0.2 mm as detected by the FQA. An estimate of percent fines is calculated as follows:

$$F_w = 100 \times \frac{\sum_{L_i < 0.2\ mm} n_i L_i}{\sum_{all\ fibers} n_i L_i}$$

The fines fraction in wood pulp comprises parenchyma cells and other non-fiber structures that do not contribute to the network quality of webs made from the fiber. It has been found through microscopic analysis that the fines measurement of fibrillated lyocell can be both fine particles and microfibers that are less than 0.20 mm in length.

Scattering coefficient is an optical property of handsheets made from the final fiber that is proportional to unbonded surface area. For this application, higher scattering coefficient generally indicates a greater degree of fibrillation. Sheet with higher scattering coefficients generally have better opacity. Scattering coefficient may be measured in accordance with TAPPI test method T 220 sp-01 or equivalent. Fiber width is the average diameter of fibers greater than 0.5 mm length.

Regarding molecular weight of the polyetheramine dispersant, molecular weight herein is reported as the weight average molecular weight, Mw or z-average molecular weight, Mz, in Daltons, and is measured by gel permeation chromatography (GPC). In a typical analysis, a portion of the sample polymer was diluted with eluent (see below) to obtain a solution with 5-g/L (0.5%) solids, which was filtered through a 5-mL, 0.5-micron Whatman® Autovial® nylon filter prior to analysis by gel permeation chromatography (GPC) using the conditions appearing below. Molecular weight averages were calculated based on poly(2-vinylpyridine) standards. Equipment and operating conditions were as follows:

Columns: Jordi-Gel® Polar-Pak WAX™ GPC at 60° C. (2 columns+guard, Jordi FLP®)
Flow: 1.5 mL/min
Eluent: 1% NaNO3+0.1% TFA in 50/50 acetonitrile/water
Injector: 200 uL
Detector: Waters® 2410 refractometer at +128 (35° C.)
Data: 40 minute runs using Waters® Empower™ GPC software on a Waters® Empower 2™ Data System (with an additional 30 minutes between runs).

Suitable equipment, standards and techniques are also described in Gel Permeation Chromatography, Waters Corporation, available Jun. 16, 2017 at http://www.waters.com/webassets/cms/library/docs/720004331en.pdf.

Commercially available polyalkylene polyols useful in connection with the present invention include those based on ethylene glycol, for example CARBOWAX® polyethylene glycols (available from The Dow® Chemical Company of Midland, Mich.); polyalkylene polyols based on propylene glycol (P-series and PT-series) or combinations of ethylene glycol and propylene glycol (EP-series), also available from the Dow® Chemical Company of Midland, Mich.; polyalkylene polyols based on propylene glycol available from Bayer Material Science of Pittsburgh, Pa. under the ACCLAIM® trade name; and polyalkylene polyols based on tetramethylene glycol, such as those available from the INVISTA™ Company of Wichita, Kans. under the TERETHANE® trade name. Examples of polyether diamines of this kind are JEFFAMINE® ED Series polyether diamines such as HK-511, ED-600 (XTJ-500), ED-900 (XTJ-501), and ED-2003 (XTJ-502).

Polyalkylene polyol diamines include JEFFAMINE® ED-900 and ED-2300 polyetheramines which are aliphatic polyether diamines derived from a propylene oxide-capped polyethylene glycol. They are water soluble, with an approximate molecular weights of 900 and 2300 Daltons respectively and melting points around room temperature. These compounds have the following structure:

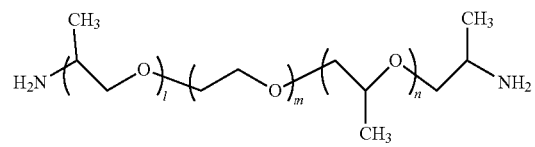

wherein m≈12.5, l+n≈6 for JEFFAMINE® ED-900 and m≈39 and l+n≈6 for JEFFAMINE® ED-2300.

In one method of manufacturing the cationic polyetheramine, the polyether diamine, polyether bisepoxide, optionally the epoxy ammonium salt, and optionally a solvent and catalyst, are charged to a reactor. The reactor can be a batch reactor, a continuous reactor or a semicontinuous reactor. It is desirable for the reactor to have heating, cooling, agitation, condensation, and distillation capabilities, forming the reactor system. The reactor system can comprise a single continuous stirred tank reactor in fluid communication with a reboiler in fluid communication with a distillation column. The distillation column is used to remove excess solvent after the completion of the copolymerization and end-capping reactions to obtain the desired final percent solids level.

A continuous reactor system generally employs a plurality of reactors in series or in parallel so that various parts of the process can be conducted in different reactors simultaneously. In a continuous reactor system the reactants and optional solvent and catalyst are charged to a first reactor. When the conversion of polyether diamine I, polyether bisepoxide II to polyetheramine is greater than or equal to about 50%, a portion of the product mixture from the first reactor is transferred to a second reactor wherein the copolymerization and end-capping continues, while at the same time additional reactants and optional solvent and catalyst are continuously being charged to the first reactor for partial copolymerization to polyetheramine. Epoxy quaternary ammonium salt III can be added to the first reactor, second reactor, or to both the first and second reactor in the continuous reactor system.

When using a batch reactor, polyether diamine I, polyether bisepoxide II, epoxy quaternary ammonium salt III, and optionally solvent and catalyst are charged to the reactor in batches and the product is removed from the reactor likewise in batches only after the reaction has been completed to an extent of at least about 80%. It is desirable to conduct the reaction under conditions where polyether diamine I, polyether bisepoxide II, and epoxy quaternary ammonium salt III are added as single charges. The optional solvent and catalyst can likewise be added in a single charge, added in several separate charges, or added continuously as the extent of polymerization and viscosity of the reaction mixture increases. In some cases, the copolymerization is conducted in a batch reactor, while the end-capping is conducted in the same or in a second batch reactor.

The copolymerization and end-capping reactions can be carried out under a blanket of an inert gas (e.g., argon, nitrogen, and the like). For removal of a portion or all of the solvent by distillation, the mixture can be subjected to a vacuum of about 5 to less than 760 torr, specifically about 10 to about 500 torr, more specifically about 10 to about 100 torr, and a temperature sufficient to effect boiling of the solvent at the given pressure. Upon completion of the copolymerization and end-capping reactions, and optional partial or complete removal of solvent, the cationic copolyetheramine, optionally dissolved in solvent, is cooled to room temperature and discharged from the reactor for use.

If at least one of the polyether diamine, the polyether bisepoxide, and quaternary ammonium salt is a liquid at the reaction temperature, the copolymerization can be conducted in the absence of a solvent. Optionally, a solvent can be used. Examples of suitable solvents are polar aprotic organic solvents, such as dimethylformamide and dimethyl sulfoxide, and polar protic solvents having active hydrogen atoms, such as methanol and ethanol, and water. In some cases, the solvent is water. The amount of solvent can be such that the percent solids of the reactants, based on the total weight of the reactants and solvent, is 1 to 100 wt %, specifically 5 to 70 wt %, and more specifically 10 to 50%. Although the reaction is self-catalyzed due to the presence of primary amine groups in the polyetheramine, optionally an external catalyst can be added. If so desired, quaternary ammonium salt III is added as a 50-80 wt % aqueous solution. The end-capping reaction with quaternary ammonium salt III can be done prior to, simultaneous with, or after the copolymerization of the polyether diamine with the polyether bisepoxide.

Optionally, the cationic polyetheramine dispersant is advantageously dissolved in water to form an aqueous solution free of microgel for ease of handling. The concentration of the cationic polyetheramine in water is 1 to 90 wt %, specifically, 10 to 70 wt %, more specifically 20 to 50 wt %, and still more specifically 30 to 40 wt %. The concentration is such that the viscosity of the solution is acceptable for its end use application. The viscosity of the aqueous solution of cationic polyetheramine may be from 1 to 100,000 cP, specifically 1 to 1000 cP, more specifically 1 to 200 cP, and still more specifically 1 to 100 cP.

A method for dispersion of hydrophilic fibers in water with the cationic polyetheramine dispersant is also disclosed. The method comprises mixing the hydrophilic fibers, the cationic polyetheramine dispersant, and water at a temperature and a time necessary to disperse the fibers and to minimize nits and flocculation. From 0.01 to 50 wt %, specifically 0.1 to 20 wt %, more specifically 0.5 to 10 wt %, and still more specifically 1 to 5 wt %, based on the weight of the fiber pulp, of cationic polyetheramine dispersant is mixed with the fiber pulp. Examples of hydrophilic cellulosic fibers are hemp fibers and solvent regenerated cellulosic fibers. An exemplary solvent regenerated cellulosic fiber is lyocell.

EXAMPLES

Example 1. Synthesis of a Cationic Polyetheramine from Jeffamine® ED-900

2.69 g (11 mmol) of a 77.5 wt % aqueous solution (80% active epoxide) of glycidyl-trimethylammonium chloride, 54.07 g PEG-500-diglycidyl ether (205.5 mmol oxirane groups), 238.27 g deionized water, and 100.00 g Jeffamine® ED-900 (216 mmol amine groups) are mixed and stirred with heating at 68° C. for 1 hr. An additional 390 mL of deionized water was added, and the mixture was stirred overnight. The product had 20.26 wt % solids. $M_w$ and $M_z$ were 105,021 and 495,188 Daltons, respectively. No gels were present.

Example 2. Handsheet Formation from Hemp Fibers

The cationic polyetheramine was added at a dosage of 5% to hemp fibers and handsheets were made. Handsheet formation was improved compared to handsheets made with untreated hemp fibers in a like manner. (See FIG. 1, wherein the handsheet made with untreated fiber, top, exhibits less uniformity than the handsheet made with treated fiber, bottom.)

Example 3. Dispersion of Lyocell Fibers

Cationic polyetheramine was added at a dosage of 1% to 8 mm lyocell fibers in a graduated cylinder of water and shaken. The fibers showed little tendency towards nits or flocculation compared to an untreated sample handled in the same manner.

Example 4. Cationic Polyetheramine Protects Lyocell Fiber During Minipulper Fibrillation A Lamort minipulper was used to pulp Tencel® lyocell at 2% consistency using a low-consistency rotor operated at the high-speed rpm setting. Total batch size was 20 liters with 400 g fiber that was nominally 8 mm length and 1.5 denier. The cationic polyetheramine cellulose dispersant, was added at 0, 20, and 100 lb/ton fiber in three separate batches. The results are summarized in Table 1.

TABLE 1

| Dose, lb/t | Time, min | Freeness, ml | Length, mm | Fines, % | Scat. Coef., m²/kg | Width, μm |
|---|---|---|---|---|---|---|
| 0 | 210 | 24 | 1.53 | 23.6 | 123 | 16.4 |
| 20 | 250 | 27 | 1.78 | 20.5 | 146 | 16.6 |
| 100 | 270 | 41 | 1.86 | 16.5 | 129 | 16.5 |

The cationic polyetheramine results in higher final fiber length and lower fines while improving scattering coefficient.

Example 5. Minipulper Fibrillation of Lyocell

Example 5 was conducted in a similar manner to Example 4 with a lower dose of the cationic polyetheramine cellulose dispersant. Table 2 summarizes results.

TABLE 2

| Dose, lb/t | Time, min | Freeness, ml | Length, mm | Fines, % | Scat. Coef., m²/kg | Width, μm |
|---|---|---|---|---|---|---|
| 0 | 210 | 34 | 1.63 | 21.7 | 146 | 17.4 |
| 5 | 210 | 48 | 1.74 | 22.2 | 142 | 16.6 |
| 10 | 250 | 46 | 1.86 | 20.9 | 130 | 17.4 |

The trend of increasing fiber length with dosage is apparent.

Example 6. Refining Lyocell in a Disk Refiner

A double-disk refiner was used to fibrillate 8 mm Tencel® lyocell fibers. The 24" refiner was operated in single-disk mode at approximately 1.5% consistency. The 8 mm lyocell has a tendency to twist and form fiber bundles herein referred to as nits when processed through a convolving machine. It is beneficial to have a cutting phase (high power) before fibrillation to reduce the average fiber length. It has been found empirically that first cutting the fiber to less than 3 mm (Lw) results a finished product with relatively few nits. Table 3 shows the results of refined 8 mm lyocell after the cutting phase. The Passes refers to the number of times the batch has passed through the refiner.

TABLE 3

| Dose, lb/t | Passes | Length, mm | Fines, % | Width, μm |
|---|---|---|---|---|
| 0 | 5.2 | 2.80 | 2.90 | 21.7 |
| 5 | 3.8 | 2.99 | 1.52 | 21.8 |
| 10 | 4.6 | 2.95 | 1.66 | 21.5 |
| 20 | 6.8 | 2.91 | 1.81 | 21.6 |

The results in Table 3 show that the cationic polyetheramine cellulose dispersant enables the cutting phase to be completed while generating fewer undesired fines.

Figure 2:
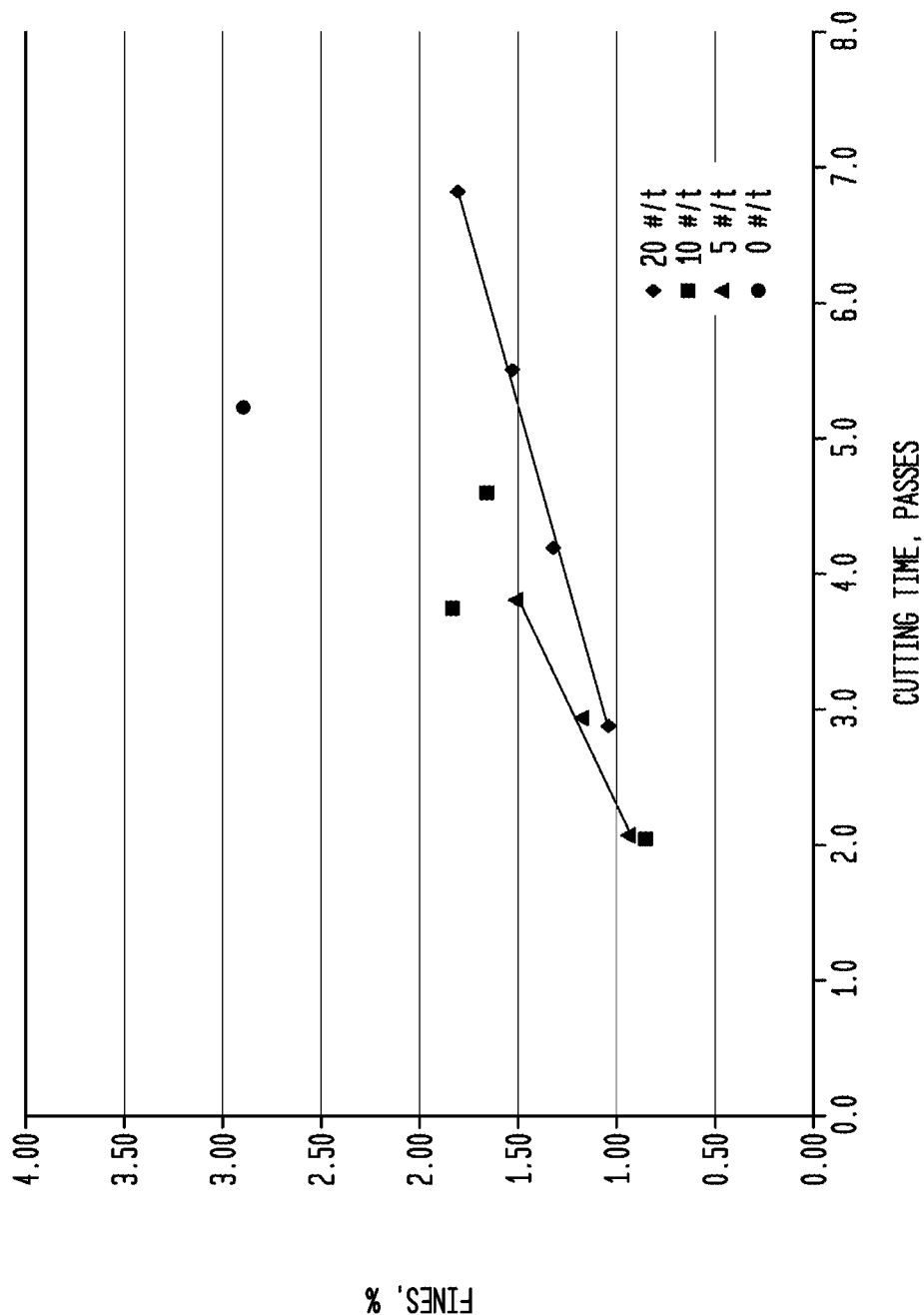
FIG. 2 is a graph presenting data on the reduced generation of fines during refining of lyocell in the presence of the cationic polyetheramine dispersant.

FIG. 2 shows additional data in graphical form. The cationic ployetheramine enables less fines generation during the cutting phase. At the end of fibrillation, the fiber is longer and the fines are fewer when cationic polyetheramine is present as shown in Table 4.

TABLE 4

| Dose, lb/t | Time, min | Freeness, ml | Length, mm | Fines, % | Scat. Coef., m²/kg | Width, μm |
|---|---|---|---|---|---|---|
| 0 | 120 | 30 | 1.22 | 23.4 | 118 | 16.4 |
| 5 | 110 | 32 | 1.35 | 21.4 | 119 | 16.9 |
| 10 | 105 | 40 | 1.50 | 19.7 | 103 | 17.3 |
| 20 | 125 | 69 | 1.41 | 19.8 | 107 | 17.1 |

EMBODIMENTS OF THE INVENTION

There is thus provided in accordance with the invention in one aspect, embodiment No. 1 which is directed to a cationic polyether amine dispersant for papermaking fibers comprising the reaction product of a polyether diamine comprising the reaction product of a polyether diamine comprising the formula I:

$$NH_2-Q-P^1-Q-NH_2 \qquad \text{I,}$$

wherein,
$P^1$ is $-(AO)_u(EO)_v(AO)_w-$, $-(EO)_x(AO)_y(EO)_z-$, or combinations thereof;
Q is a $C_1$-$C_8$ alkylene or a direct bond;
EO is oxyethylene ($-(OCH_2CH_2)-$);
AO is oxyalkylene comprising 3 to 6 carbon atoms; and
u+w or y is from 0 to 20, v or x+z is from 4 to 60;
a polyether bisepoxide comprising the formula II:

$$O(CH_2-CH)-CH_2-P^2-CH_2-(CH-CH_2)O \qquad \text{II}$$

wherein,
$P^2$ is $-(AO)_o(EO)_p(AO)_q-$ or $-(EO)_r(AO)_s(EO)_t-$;
EO is oxyethylene ($-(OCH_2CH_2)-$);
AO is oxyalkylene comprising 3 to 6 carbon atoms; and
p or r+t is from 2 to 60, o+q or s is from 0 to 8;
and a quaternary ammonium salt comprising the formula III:

$$O(CH_2-CH)-CH_2-N^+R^1R^2R^3X^- \qquad \text{III}$$

wherein,
$R^1$, $R^2$, and $R^3$ are each independently $C_1$-$C_8$ alkyl; and
X is a counteranion,
wherein the polyether diamine, the polyether bisepoxide and the quaternary ammonium salt reactants are reacted in the following molar ratios: the molar ratio of amine functionality of the polyether diamine to epoxide functionality of the polyether bisepoxide is from 0.5:1 to 2:1 and the molar ratio of the amine functionality of the polyether diamine to the epoxide functionality of the quaternary ammonium salt is from 10:1 to 40:1.

Embodiment No. 2 is the cationic polyether amine dispersant for papermaking fibers according to Embodiment No. 1, wherein v or x+z is from 4 to 45.

Embodiment No. 3 is the cationic polyether amine dispersant for papermaking fibers according to Embodiment No. 1, wherein v or x+z is from 4 to 30.

Embodiment No. 4 is the cationic polyether amine dispersant for papermaking fibers according to Embodiment No. 1, wherein v or x+z is from 8 to 20.

Embodiment No. 5 is the cationic polyether amine dispersant for papermaking fibers according to Embodiment Nos. 1 or 2, wherein u+w or y is from 4 to 16.

Embodiment No. 6 is the cationic polyether amine dispersant for papermaking fibers according to any of the foregoing Embodiments, wherein p or r+t is from 2 to 45.

Embodiment No. 7 is the cationic polyether amine dispersant for papermaking fibers according to any of the foregoing Embodiments, wherein p or r+t is from 2 to 20.

Embodiment No. 8 is the cationic polyether amine dispersant for papermaking fibers according to any of the foregoing Embodiments, wherein p or r+t is from 6 to 16.

Embodiment No. 9 is the cationic polyether amine dispersant for papermaking fibers according to any of the foregoing Embodiments, wherein o+q or s is from 0 to 4.

Embodiment No. 10 is the cationic polyether amine dispersant for papermaking fibers according to any of the foregoing Embodiments, wherein the molar ratio of amine functionality of the polyester diamine to the epoxide functionality of the polyether bisepoxide is from 0.75:1 to 1.5:1.

Embodiment No. 11 is the cationic polyether amine dispersant for papermaking fibers according to Embodiment No. 10, wherein the molar ratio of amine functionality of the polyester diamine to the epoxide functionality of the polyether bisepoxide is from 0.9:1 to 1.25:1.

Embodiment No. 12 is the cationic polyether amine dispersant for papermaking fibers according to any of the foregoing Embodiments, wherein the molar ratio of the amine functionality of the polyether diamine to the epoxide functionality of the quaternary ammonium salt is from 15:1 to 30:1.

Embodiment No. 13 is the cationic polyether amine dispersant for papermaking fibers according to any of the foregoing Embodiments, wherein AO is oxyalkylene comprising 3 to 4 carbon atoms.

Embodiment No. 14 is the cationic polyether amine dispersant for papermaking fibers according to Embodiment No. 13, wherein AO is oxyalkylene comprising 3 carbon atoms.

Embodiment No. 15 is the cationic polyether amine dispersant for papermaking fibers according to Embodiment 14, wherein AO is —$OCH_2CH(CH_3)$— and/or —$OCH(CH_3)CH_2$—.

Embodiment No. 16 is the cationic polyether amine dispersant for papermaking fibers according to any of the foregoing Embodiments, wherein $P^2$ is -$(EO)_p$—.

Embodiment No. 17 is the cationic polyether amine dispersant for papermaking fibers according to any of the foregoing Embodiments, wherein $R^1$, $R^2$, and $R^3$ are each independently alkyl.

Embodiment No. 18 is the cationic polyether amine dispersant for papermaking fibers according to Embodiment No. 17, wherein $R^1$, $R^2$, and $R^3$ are methyl groups.

Embodiment No. 19 is the cationic polyether amine dispersant for papermaking fibers according to any of the foregoing Embodiments, wherein X is chloride, bromide, iodide, hydrogen sulfate, p-toluenesulfonate, or methanesulfonate.

Embodiment No. 20 is the cationic polyether amine dispersant for papermaking fibers according to Embodiment No. 19, wherein X is chloride.

Embodiment No. 21 is the cationic polyether amine dispersant for papermaking fibers according to any of the foregoing Embodiments, wherein the cationic polyether amine dispersant has a molecular weight, Mw, of from 25,000 to 400,000 Daltons.

Embodiment No. 22 is the cationic polyether amine dispersant for papermaking fibers according to Embodiment No. 21, wherein the cationic polyether amine dispersant has a molecular weight, Mw, of from 50,000 to 200,000 Daltons.

Embodiment No. 23 is the cationic polyether amine dispersant for papermaking fibers according to Embodiment No. 22, wherein the cationic polyether amine dispersant has a molecular weight, Mw, of from 75,000 to 150,000 Daltons.

Embodiment No. 24 is a method for preparing papermaking stock comprising:
(a) providing an aqueous slurry of cellulosic papermaking fibers;
(b) dosing the aqueous slurry of cellulosic papermaking fibers with the cationic polyether amine dispersant of any of claims 1-23; and
(c) mechanically agitating the dosed slurry.

Embodiment No. 25 is the method for preparing papermaking stock according to Embodiment No. 24, wherein the aqueous slurry is dosed with cationic polyether amine dispersant at an add-on level of from 0.5 to 200 pounds of the cationic polyether amine dispersant per ton of the cellulosic papermaking fibers.

Embodiment No. 26 is the method for preparing papermaking stock according to Embodiment No. 25, wherein the aqueous slurry is dosed with cationic polyether amine dispersant at an add-on level of from 0.5 to 150 pounds of the cationic polyether amine dispersant per ton of the cellulosic papermaking fibers.

Embodiment No. 27 is the method for preparing papermaking stock according to Embodiment No. 26, wherein the aqueous slurry is dosed with cationic polyether amine dispersant at an add-on level of from 0.5 to 100 pounds of the cationic polyether amine dispersant per ton of the cellulosic papermaking fibers.

Embodiment No. 28 is the method for preparing papermaking stock according to Embodiment No. 24, wherein the aqueous slurry is dosed with cationic polyether amine dispersant at an add-on level of from 0.5 to 40 pounds of the cationic polyether amine dispersant per ton of the cellulosic papermaking fibers.

Embodiment No. 29 method for preparing papermaking stock according to Embodiment No. 28, wherein the aqueous slurry is dosed with cationic polyether amine dispersant at an add-on level of from 1 to 20 pounds of the cationic polyether amine dispersant per ton of the cellulosic papermaking fibers.

Embodiment No. 30 is the method for preparing papermaking stock according to Embodiment No. 28, wherein the aqueous slurry is dosed with the cationic polyether amine dispersant at an add-on level of from 2.5 to 40 pounds of the cationic polyether amine dispersant per ton of the cellulosic papermaking fibers.

Embodiment No. 31 method for preparing papermaking stock according to Embodiment No. 30, wherein the aqueous slurry is dosed with the cationic polyether amine dispersant at an add-on level of from 5 to 20 pounds of the cationic polyether amine dispersant per ton of the cellulosic papermaking fibers.

Embodiment No. 32 is the method for preparing papermaking stock according to Embodiment No. 30, wherein the aqueous slurry is dosed with the cationic polyether amine dispersant at an add-on level of from 10 to 25 pounds of the cationic polyether amine dispersant per ton of the cellulosic papermaking fibers.

Embodiment No. 33 is the method for preparing papermaking stock according to any of Embodiment Nos. 24-32, wherein the aqueous slurry of cellulosic papermaking fibers has a consistency of less than 30%.

Embodiment No. 34 is the method for preparing papermaking stock according to Embodiment 33, wherein the aqueous slurry of cellulosic papermaking fibers has a consistency of from 5% to 9%.

Embodiment No. 35 method for preparing papermaking stock according to Embodiment No. 33, wherein the aqueous slurry of cellulosic papermaking fibers has a consistency of 5% or less.

Embodiment No. 36 is the method for preparing papermaking stock according to Embodiment No. 33, wherein the aqueous slurry of cellulosic papermaking fibers has a consistency of from 1% to 5%.

Embodiment No. 37 is the method for preparing papermaking stock according to Embodiment No. 33, wherein the aqueous slurry of cellulosic papermaking fibers has a consistency of from 0.25% to less than 1%.

Embodiment No. 38 is the method for preparing papermaking stock according to any of Embodiment Nos. 24-37, wherein the cellulosic papermaking fibers comprise fibers having an average length of 5 mm or more, optionally up to an average fiber length of 15 mm, 20 mm, 25 mm or more.

Embodiment No. 39 is the method for preparing papermaking stock according to any of Embodiment Nos. 24-38, wherein the cellulosic papermaking fibers comprise naturally occurring fibers selected from hemp fibers, flax fibers or cotton fibers.

Embodiment No. 40 is the method for preparing papermaking stock according to any of Embodiment Nos. 24-38, wherein the cellulosic papermaking fibers comprise regenerated cellulose fibers.

Embodiment No. 41 is the method for preparing papermaking stock according to Embodiment No. 40, wherein the regenerated cellulosic papermaking fibers comprise rayon fibers.

Embodiment No. 42 is the method for preparing papermaking stock according to Embodiment No. 41, wherein the rayon fibers are selected from viscose rayon or acetate rayon.

Embodiment No. 43 is the method for preparing papermaking stock according to Embodiment No. 40, wherein the regenerated cellulosic papermaking fibers are lyocell fibers.

Embodiment No. 44 is the method for preparing papermaking stock according to Embodiment No. 43, wherein the lyocell fibers have a coarseness of less than 25 mg/100 m.

Embodiment No. 45 is the method for preparing papermaking stock according to Embodiment No. 44, wherein the lyocell fibers have a coarseness of from 5 to 20 mg/100 m.

In still further embodiments of the present invention, there is provided a method of making a cationic polyether amine dispersant for papermaking fibers comprising reacting a polyether diamine, a polyether bisepoxide and a quaternary ammonium salt in the following molar ratios: the molar ratio of amine functionality of the polyether diamine to epoxide functionality of the polyether bisepoxide is from 0.5:1 to 2:1 and the molar ratio of the amine functionality of the polyether diamine to the epoxide functionality of the quaternary ammonium salt is from 10:1 to 40:1. The polyether diamine is of the formula I:

$$NH_2\text{-}Q\text{-}P^1\text{-}Q\text{-}NH_2 \quad\quad\quad I,$$

wherein,
$P^1$ is 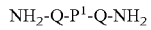 $\text{-}(AO)_u(EO)_v(AO)_w\text{---}$, $\text{-}(EO)_x(AO)_y(EO)_z\text{---}$, or combinations thereof;
Q is a $C_1\text{-}C_8$ alkylene or a direct bond;
EO is oxyethylene ($\text{---}(OCH_2CH_2)\text{---}$);
AO is oxyalkylene comprising 3 to 6 carbon atoms; and
u+w or y is from 0 to 20, v or x+z is from 4 to 60;
The polyether bisepoxide is of the formula II:

$$O(CH_2\text{---}CH)\text{---}CH_2\text{---}P^2\text{---}CH_2\text{---}(CH\text{---}CH_2)O \quad\quad II$$

wherein,
$P^2$ is 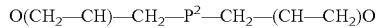 $\text{-}(AO)_o(EO)_p(AO)_q\text{---}$ or $\text{-}(EO)_r(AO)_s(EO)_t$;
EO is oxyethylene ($\text{---}(OCH_2CH_2)\text{---}$);
AO is oxyalkylene comprising 3 to 6 carbon atoms; and
p or r+t is from 2 to 60, o+q or s is from 0 to 8;
and the quaternary ammonium salt is of the formula III:

$$O(CH_2\text{---}CH)\text{---}CH_2\text{---}N^+R^1R^2R^3X^- \quad\quad III$$

wherein, 
$R^1$, $R^2$, and $R^3$ are each independently $C_1\text{-}C_8$ alkyl; and
X is a counteranion.

The process of the invention may contain any of the features and combinations recited in embodiments 1-23 detailed above with respect to the product, reactants and/or the process features enumerated in the Description above.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the foregoing description including the Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A cationic polyether amine dispersant for papermaking fibers comprising the reaction product of a polyether diamine comprising the formula I:

$$NH_2\text{-}Q\text{-}P^1\text{-}Q\text{-}NH_2 \quad\quad\quad I,$$

wherein,
$P^1$ is 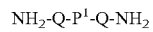 $\text{-}(AO)_u(EO)_v(AO)_w\text{---}$, $\text{-}(EO)_x(AO)_y(EO)_z\text{---}$, or combinations thereof;
Q is a $C_1\text{-}C_8$ alkylene or a direct bond;
EO is oxyethylene ($\text{---}(OCH_2CH_2)\text{---}$);
AO is oxyalkylene comprising 3 to 6 carbon atoms; and
u+w or y is from 0 to 20, v or x+z is from 4 to 60;
a polyether bisepoxide comprising the formula II:

$$O(CH_2\text{---}CH)\text{---}CH_2\text{---}P^2\text{---}CH_2\text{---}(CH\text{---}CH_2)O \quad\quad II$$

wherein,
$P^2$ is 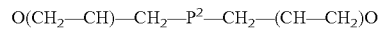 $\text{-}(AO)_o(EO)_p(AO)_q\text{---}$ or $\text{-}(EO)_r(AO)_s(EO)_t$;
EO is oxyethylene ($\text{---}(OCH_2CH_2)\text{---}$);
AO is oxyalkylene comprising 3 to 6 carbon atoms; and
p or r+t is from 2 to 60, o+q or s is from 0 to 8;
and a quaternary ammonium salt comprising the formula III:

$$O(CH_2\text{---}CH)\text{---}CH_2\text{---}N^+R^1R^2R^3X^- \quad\quad III$$

wherein, 
$R^1$, $R^2$, and $R^3$ are each independently $C_1\text{-}C_8$ alkyl; and
X is a counteranion,
wherein the polyether diamine, the polyether bisepoxide and the quaternary ammonium salt reactants are reacted in the following molar ratios: the molar ratio of amine functionality of the polyether diamine to epoxide functionality of the polyether bisepoxide is from 0.5:1 to 2:1 and the molar ratio of the amine functionality of the polyether diamine to the epoxide functionality of the quaternary ammonium salt is from 10:1 to 40:1.

2. The cationic polyether amine dispersant for papermaking fibers according to claim 1, wherein v or x+z is from 8 to 20.

3. The cationic polyether amine dispersant for papermaking fibers according to claim 1, wherein p or r+t is from 6 to 16.

4. The cationic polyether amine dispersant for papermaking fibers according to claim 1, wherein the molar ratio of amine functionality of the polyester diamine to the epoxide functionality of the polyether bisepoxide is from 0.75:1 to 1.5:1.

5. The cationic polyether amine dispersant for papermaking fibers according to claim 4, wherein the molar ratio of amine functionality of the polyester diamine to the epoxide functionality of the polyether bisepoxide is from 0.9:1 to 1.25:1.

6. The cationic polyether amine dispersant for papermaking fibers according to claim 1, wherein $P^2$ is $\text{-}(EO)_p\text{---}$.

7. The cationic polyether amine dispersant for papermaking fibers according to claim 1, wherein $R^1$, $R^2$, and $R^3$ are each independently $C_1\text{-}C_4$ alkyl.

8. The cationic polyether amine dispersant for papermaking fibers according to claim 1, wherein X is chloride, bromide, iodide, hydrogen sulfate, p-toluenesulfonate, or methanesulfonate.

9. The cationic polyether amine dispersant for papermaking fibers according to claim 1, wherein the cationic polyether amine dispersant has a molecular weight, Mw, of from 50,000 to 200,000 Daltons.

10. A method for preparing papermaking stock comprising:
(a) providing an aqueous slurry of cellulosic papermaking fibers;
(b) dosing the aqueous slurry of cellulosic papermaking fibers with the cationic polyether amine dispersant of claim 1; and
(c) mechanically agitating the dosed slurry.

11. The method for preparing papermaking stock according to claim 10, wherein the aqueous slurry is dosed with cationic polyether amine dispersant at an add-on level of from 0.5 to 200 pounds of the cationic polyether amine dispersant per ton of the cellulosic papermaking fibers.

12. The method for preparing papermaking stock according to claim 11, wherein the aqueous slurry is dosed with the cationic polyether amine dispersant at an add-on level of from 2.5 to 40 pounds of the cationic polyether amine dispersant per ton of the cellulosic papermaking fibers.

13. The method for preparing papermaking stock according to claim 10, wherein the aqueous slurry of cellulosic papermaking fibers has a consistency of less than 30%.

14. The method for preparing papermaking stock according to claim 13, wherein the aqueous slurry of cellulosic papermaking fibers has a consistency of from 1% to 5%.

15. The method for preparing papermaking stock according to claim 13, wherein the aqueous slurry of cellulosic papermaking fibers has a consistency of from 0.25% to less than 1%.

16. The method for preparing papermaking stock according to claim 10, wherein the cellulosic papermaking fibers comprise fibers having an average length of 5 mm or more.

17. The method for preparing papermaking stock according to claim 10, wherein the cellulosic papermaking fibers comprise naturally occurring fibers selected from hemp fibers, flax fibers or cotton fibers.

18. The method for preparing papermaking stock according to claim 10, wherein the cellulosic papermaking fibers comprise regenerated cellulose fibers.

19. The method for preparing papermaking stock according to claim 18, wherein the regenerated cellulosic papermaking fibers are lyocell fibers.

20. The method for preparing papermaking stock according to claim 19, wherein the lyocell fibers have a coarseness of less than 25 mg/100 m.

* * * * *